United States Patent [19]
Mangold et al.

[11] Patent Number: 5,897,675
[45] Date of Patent: Apr. 27, 1999

[54] CERIUM OXIDE-METAL/METALLOID OXIDE MIXTURE

[75] Inventors: Helmut Mangold, Rodenbach; Werner Hartmann, Babenhausen; Richard Akam, Badhomburg, all of Germany

[73] Assignee: Degussa Aktiengesellschaft, Frankfurt, Germany

[21] Appl. No.: 08/847,640

[22] Filed: Apr. 25, 1997

Related U.S. Application Data

[60] Provisional application No. 60/021,863, Jul. 16, 1996.

[30] Foreign Application Priority Data

Apr. 26, 1996 [DE] Germany .................. 196 16 780

[51] Int. Cl.⁶ .................................................. C09C 1/68
[52] U.S. Cl. ................................. 51/309; 51/308; 106/3
[58] Field of Search ................... 106/3; 51/308, 51/309

[56] References Cited

U.S. PATENT DOCUMENTS

| | | |
|---|---|---|
| 4,226,623 | 10/1980 | Koshiyama et al. ................. 106/3 |
| 4,360,388 | 11/1982 | Nauroth et al. . |
| 4,601,755 | 7/1986 | Melard et al. ..................... 51/308 |
| 4,769,073 | 9/1988 | Tastu et al. ....................... 51/309 |
| 4,786,325 | 11/1988 | Melard et al. ..................... 51/309 |
| 5,026,421 | 6/1991 | Le Loarer et al. ................. 106/3 |
| 5,264,010 | 11/1993 | Brancaleoni et al. .............. 51/308 |
| 5,591,797 | 1/1997 | Barthel et al. . |
| 5,672,095 | 9/1997 | Morimoto et al. ................. 451/41 |

FOREIGN PATENT DOCUMENTS

| | | |
|---|---|---|
| 0 649 885 A1 | 4/1995 | European Pat. Off. . |
| 2549846 | 2/1985 | France . |
| WO93/22103 | 4/1992 | WIPO . |
| WO 93/22130 | 11/1993 | WIPO . |

*Primary Examiner*—Deborah Jones
*Attorney, Agent, or Firm*—Pillsbury Madison & Sutro LLP

[57] ABSTRACT

A finely-divided cerium metal/metalloid oxide mixture, containing pyrogenically produced metal/metalloid oxide and 0.001 to 95 wt. % cerium oxide, has a specific surface area between 10 and 400 $m^2/g$. The mixture is produced by mixing pyrogenically produced metal/metalloid oxide, having a specific surface area between 30 and 400 $m^2/g$, with a cerium compound decomposable to an oxide at elevated temperature, the cerium compound being thermally decomposed to the oxide. The cerium oxide-metal/metalloid oxide mixture can be used as a polishing agent or filler.

8 Claims, No Drawings

CERIUM OXIDE-METAL/METALLOID OXIDE MIXTURE

This application claims benefit of USC provisional application No. 60/021,863, filed Jul. 16, 1996.

BACKGROUND OF THE INVENTION

Field of the Invention

The invention relates to a finely-divided cerium oxide-metal/metalloid oxide mixture, the method of manufacturing it and the use thereof.

SUMMARY OF THE INVENTION

The invention provides a finely-divided cerium oxide metal/metalloid oxide mixture containing pyrogenically produced metal/metalloid oxide and 0.001 to 95 wt. % cerium oxide, the resulting mixture having a specific surface area between 10 and 400 $m^2/g$.

The invention also provides a method of producing the finely-divided cerium oxide-metal/metalloid oxide mixture, characterized in that pyrogenically produced metal/metalloid oxide, particularly by flame hydrolysis and having a specific surface area between 30 and 400 $m^2/g$ is intensively mixed with a cerium compound decomposable to the oxide at elevated temperature, preferably the cerium carbonate, and the cerium compound is thermally decomposed to the oxide, preferably at temperatures between 300 and 600° C. and for sintering times between 0.5 and 10 hours.

In a preferred embodiment of the invention, optionally at least one of the metal/metalloid oxides produced pyrogenically, especially by flame hydrolysis, and in the form of oxides of silicon, aluminum, boron, titanium or zirconium or mixtures thereof or mixed oxides thereof is intensively mixed with a cerium compound decomposable to the oxide at elevated temperature and the cerium compound is thermally decomposed to the oxide.

The mixture according to the invention can be used alone or in suspension as a polishing agent for polishing silicon wafers or for other polishing operations occurring in the electronics industry. It can also be used as a UV-absorbing filler for filling of polymers.

DETAILED DESCRIPTION OF PREFERRED EMBODIMENTS OF THE INVENTION

EXAMPLE 1

950 g of OX 50 pyrogenic silica was intensively mixed with 83.5 g of cerium carbonate ($Ce_2(CO_3)_3 \times 5H_2O$) for 30 minutes in a Lödige mixer. The powder was then heat-treated in air at a temperature of 400° C. for 1 hour. The content of cerium oxide was 5 wt. % and the resulting BET surface area was 44 $m^2/g$.

EXAMPLE 2

950 g of OX 50 pyrogenic silica was intensively mixed with 83.5 g of cerium carbonate ($Ce_2(CO_3)_3 \times 5H_2O$) for 30 minutes in a Lödige mixer. The powder was then heat-treated in air at a temperature of 500° C. for 1 hour. The content of cerium oxide was 5 wt. % and the resulting BET surface area was 41 $m^2/g$.

EXAMPLE 3

900 g of OX 50 pyrogenic silica was intensively mixed with 167 g of cerium carbonate ($Ce_2(CO_3)_3 \times 5H_2O$) for 30 minutes in a Lödige mixer. The powder was then heat-treated in air at a temperature of 400° C. for 1 hour. The content of cerium oxide was 10 wt. % and the resulting BET surface area was 44 $m^2/g$.

EXAMPLE 4

900 g of OX 50 pyrogenic silica was intensively mixed with 167 g of cerium carbonate ($Ce_2(CO_3)_3 \times 5H_2O$) for 30 minutes in a Lödige mixer. The powder was then heat-treated in air at a temperature of 500° C. for 1 hour. The content of cerium oxide was 10 wt. % and the resulting BET surface area was 42 $m^2/g$.

Analysis of the powder samples in Examples 1 to 4:

| Example | $CeO_2$ wt. % | Sintering temperature [° C.] | Sintering time [h] | Tapped density [g/l] | BET surface area [$m^2/g$] | Loss on drying [wt. %] | Ignition loss [wt. %] |
| --- | --- | --- | --- | --- | --- | --- | --- |
| 1 | 5 | 400 | 1 | 139 | 44 | 0.3 | 0.4 |
| 2 | 5 | 500 | 1 | 143 | 41 | 0.1 | 0.2 |
| 3 | 10 | 400 | 1 | 173 | 44 | 0.05 | 0.7 |
| 4 | 10 | 500 | 1 | 172 | 42 | 0.05 | 0.5 |

Loss on drying (2 hours at 105° C., according to DIN/ISO 787/II, ASTM D 280, JIS K 5101/21).

Ignition loss (2 hours at 1000° C., according to DIN 55921, ASTM D 1208, JIS K 5101/23, relative to the substance dried for 2 hours at 105° C.).

The pyrogenic OX 50 silica, produced by flame hydrolysis of $SiCl_4$ (manufactured by Degussa) has the following physical and chemical characteristics:

| | | AEROSIL OX 50 CAS Reg. No. 112945-52-5 (Old No: 7631-86-9) |
| --- | --- | --- |
| Behavior towards water | | Hydrophilic |
| Appearance | | Loose white powder |
| BET surface area[1] | $m^2/g$ | 50 ± 15 |
| Average size of primary particles | nm | 40 |
| Tapped density[2] of normal product | g/l | about 130 |
| Loss on drying[3] (2 hours at 105° C.) On leaving the supplier's factory | wt. % | <1.5 |
| Ignition loss [4)7)] (2 hours at 1000° C.) | wt. % | <1 |
| pH[5] (in 4% aqueous dispersion) | | 3.8–4.8 |
| $SiO_2$[8] | wt. % | >99.8 |
| $Al_2O_3$[8] | wt. % | <0.08 |
| $Fe_2O_3$[8] | wt. % | <0.01 |
| $TiO_2$[8] | wt. % | <0.03 |

-continued

| | | AEROSIL OX 50<br>CAS Reg. No.<br>112945-52-5<br>(Old No: 7631-86-9) |
|---|---|---|
| HCl[8)11)] | wt. % | <0.025 |
| Sieve residue[6)] (by Mocker, 45 μm) | | <0.2 |

[1)]According to DIN 66 131
[2)]According to DIN ISO 787/XI, JIS K 5101/18 (not sieved)
[3)]According to DIN ISO 787/II, ASTM D 280, JIS K 5101/21
[4)]According to DIN 55 921, ASTM D 1208, JIS K 5101/23
[5)]According to DIN ISO 787/IX, ASTM D 1208, JIS K 5101/24
[6)]According to DIN ISO 787/XVIII, JIS K 5101/20
[7)]Based on material dried for 2 h at 105° C.
[8)]Based on material ignited for 2 h at 1000° C.
[11)]The HCl content is a part of the ignition loss

What is claimed is:

1. A finely divided cerium oxide metal/metalloid oxide mixture containing pyrogenically produced metal/metalloid oxide comprising at least one member selected from the groul consisting of oxides and mixed oxides of silicon, aluminum, boron, titanium, zirconium and mixtures thereof and 0.001 to 95 wt. % cerium oxide, the resulting mixture having a specific surface area between 10 and 400 m$^2$/g.

2. A method of producing a finely divided cerium oxide metal/metalloid oxide mixture, comprising:

intensively mixing pyrogenically produced metal/metalloid oxide having a specific surface area between 30 and 400 m$^2$/g with a cerium compound decomposable to an oxide at elevated temperature, and thermally decomposing the cerium compound to the oxide.

3. A method according to claim 2, comprising:

intensively mixing at least one pyrogenically produced metal/metalloid oxide comprising at least one member selected from the group consisting of oxides and mixed oxides of silicon, aluminum, boron, titanium zirconium and mixtures thereof, with the cerium compound.

4. A method according to claim 2, wherein at least one of the pyrogenically produced metal/metalloid oxides is produced by flame hydrolysis.

5. A method according to claim 2, wherein the cerium compound is cerium carbonate.

6. A method according to claim 2, wherein the thermal decomposition takes place at temperatures between 300° and 600° C.

7. A method according to claim 2, wherein the thermal decomposition takes place during a sintering time of between 0.5 and 10 hours.

8. A polishing agent for polishing silicon wafers comprising the mixture according to claim 1.

* * * * *